(12) United States Patent
Cox

(10) Patent No.: US 8,548,380 B2
(45) Date of Patent: Oct. 1, 2013

(54) COMMUNICATIONS DEVICE FOR INTELLIGENTLY ROUTING INFORMATION AMONG MULTIPLE USER INTERFACES

(75) Inventor: David Grant Cox, Newbury (GB)

(73) Assignee: Broadcom Corporation, Irvine, CA (US)

( * ) Notice: Subject to any disclaimer, the term of this patent is extended or adjusted under 35 U.S.C. 154(b) by 245 days.

(21) Appl. No.: 13/157,518

(22) Filed: Jun. 10, 2011

(65) Prior Publication Data
US 2012/0315843 A1    Dec. 13, 2012

(51) Int. Cl.
*H04B 5/00* (2006.01)

(52) U.S. Cl.
USPC ...... 455/41.1; 455/41.2; 455/573; 455/412.1; 455/343.2; 455/343.5; 455/410; 235/492; 235/380; 235/451; 340/10.5; 340/572.1; 705/41; 705/122

(58) Field of Classification Search
USPC .............. 455/41.1, 41.2, 573, 343.2, 343.5, 455/412.1, 410
See application file for complete search history.

(56) References Cited

U.S. PATENT DOCUMENTS

| | | | |
|---|---|---|---|
| 7,499,985 B2 * | 3/2009 | Linjama et al. | 709/220 |
| 7,920,851 B2 * | 4/2011 | Moshir et al. | 455/414.2 |
| 7,970,350 B2 * | 6/2011 | Sheynman et al. | 455/41.1 |
| 8,225,380 B2 * | 7/2012 | Moshir et al. | 726/5 |
| 8,280,359 B2 * | 10/2012 | Moshir et al. | 455/414.3 |
| 8,284,061 B1 * | 10/2012 | Dione | 340/572.1 |
| 2010/0146312 A1 * | 6/2010 | Liao | 713/310 |
| 2012/0302223 A1 * | 11/2012 | Austin et al. | 455/418 |

OTHER PUBLICATIONS

International Standard: ISO/IEC 21481, Information technology—Telecommunications and information exchange between systems—Near Field Communication Interface and Protocol -2 (NFCIP-2), pp. 1-12, First edition, Reference No. ISO/IEC 21481:2005(E), ISO/IEC (Jan. 2005).

International Standard: ISO/IEC 18092, Information technology—Telecommunications and information exchange between systems—Near Field Communication—Interface and Protocol (NFCIP-1), pp. 1-66, First edition, Reference No. ISO/IEC 18092:2004(E), ISO/IEC (Apr. 2004).

* cited by examiner

*Primary Examiner* — Marceau Milord
(74) *Attorney, Agent, or Firm* — Sterne, Kessler, Goldstein & Fox P.L.L.C.

(57) ABSTRACT

A near field communications (NFC) device is disclosed that intelligently routes NFC data from a NFC device between multiple user interfaces based upon a power level of its internal batteries. The communications device utilizes a communications device user interface to send and/or receive the NFC data from the NFC device when its internal batteries are sufficient to operate the communications device user interface. The communications device begins to route some of this NFC data from being sent and/or received by the communications device user interface to a NFC user interface as its internal batteries deplete. Eventually, all of the NFC data will be sent to and/or received by the NFC user interface as the internal batteries of the communications device become so depleted that they are unable to reliably operate the communications device user interface.

20 Claims, 13 Drawing Sheets

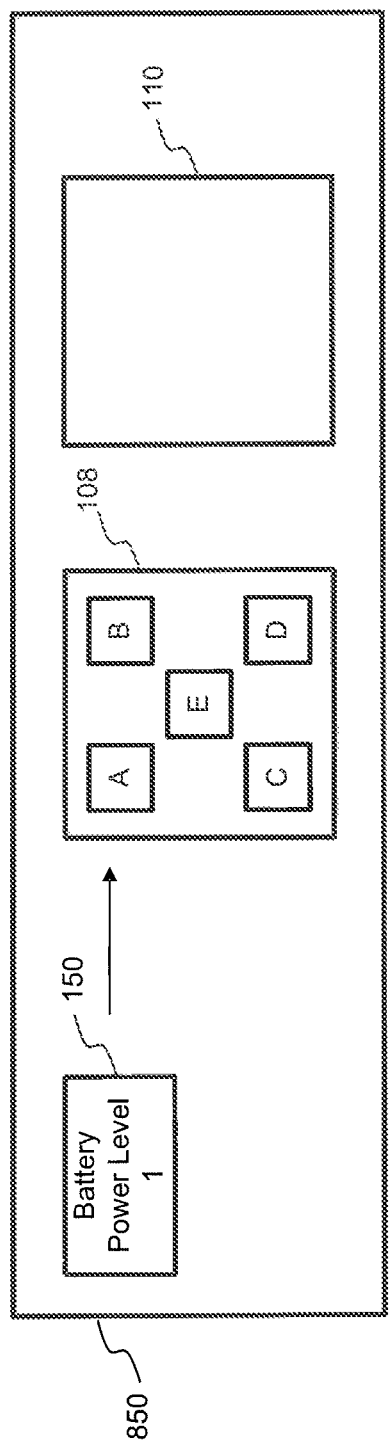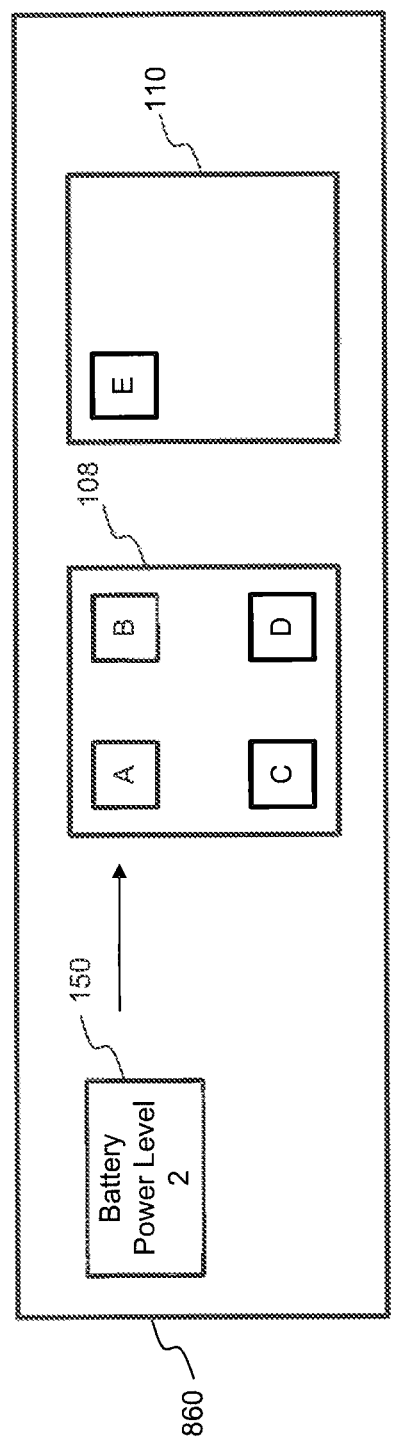

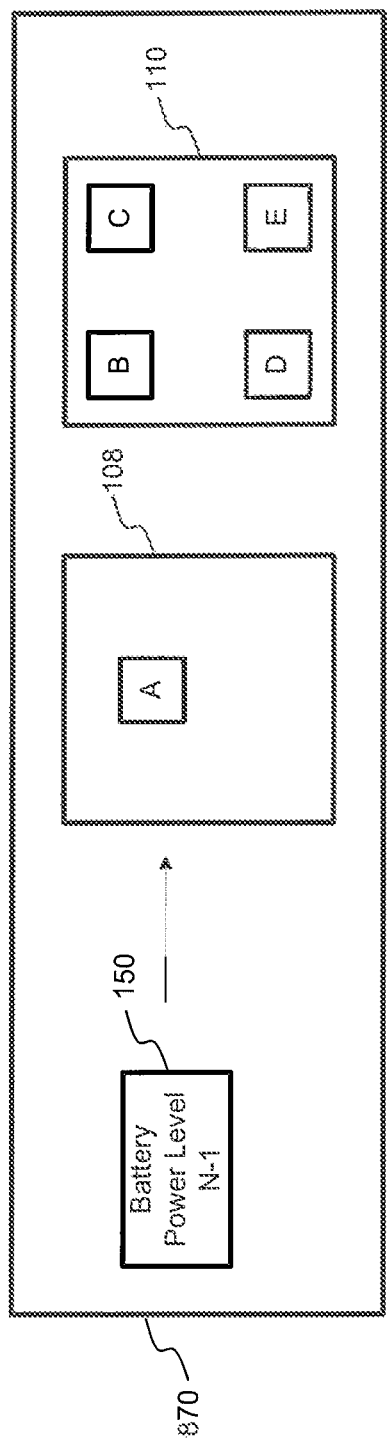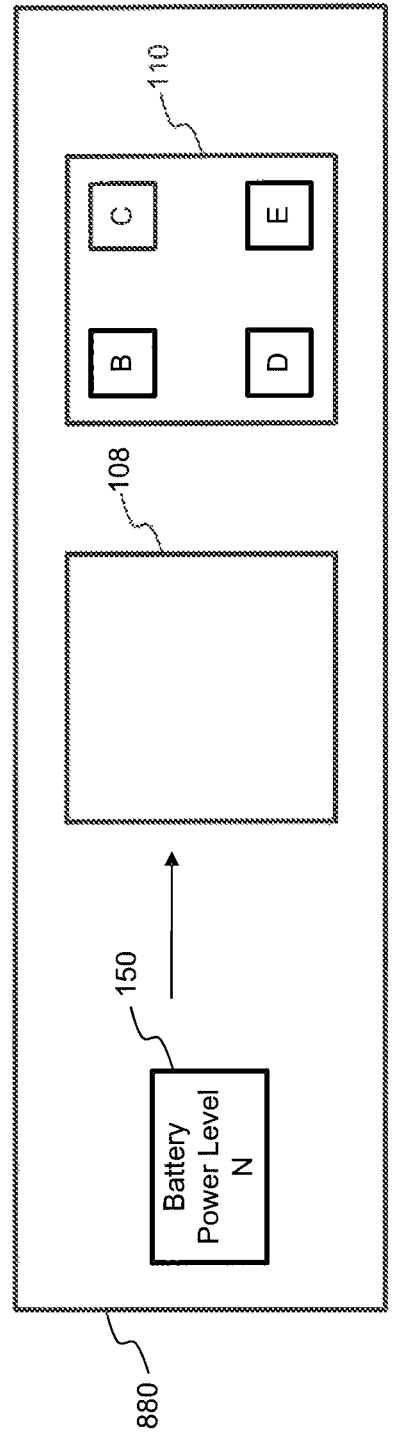

COMMUNICATIONS DEVICE FOR INTELLIGENTLY ROUTING INFORMATION AMONG MULTIPLE USER INTERFACES

BACKGROUND

1. Field of Invention

The invention relates to near field communications (NFC), and more specifically to intelligently operating multiple user interfaces within a communications device.

2. Related Art

Near field communication (NFC) devices are being integrated into communications devices, such as smartphones to provide an example, to facilitate the use of these communications devices in conducting daily transactions. For example, instead of carrying numerous credit cards, credit information provided by these credit cards could be stored onto the NFC devices. The communications device is simply tapped to a credit card terminal to relay the credit information to complete a transaction. As another example, a ticketing writing system, such as those used in bus and train terminals to provide some examples, may simply write ticket fare information onto the NFC device instead of providing a ticket to a passenger. The passenger simply taps the communications device to a reader to ride the bus or the train without the use of a paper ticket.

Generally, NFC requires that two NFC devices be present within a relatively small distance from one another so that their corresponding magnetic fields can exchange information. Typically, a first NFC device transmits or generates a magnetic field modulated with the information, such as the credit information or the ticket fare information to provide some examples. This magnetic field inductively couples onto a second NFC device that is proximate to the first NFC device. The second NFC device may respond to the first NFC device by modulating the magnetic field of the first NFC device or by generating its own modulated magnetic field and inductively coupling this modulated magnetic field to the first NFC device.

Typically, the communications device includes a conventional user interface that is shared with the NFC device allowing an operator to operate and/or control both the communications device and the NFC device. For example, the conventional user interface operates as an output device to receive information, such as one or more commands and/or data to provide some examples, from the communications device and/or the NFC device to be provided to the operator. The conventional user interface also operates an input device to provide information, such as one or more commands and/or data to provide some examples, from the operator to the communications device and/or the NFC device. The conventional user interface derives its power from the internal batteries of the communications device.

Operation of the first and the second NFC devices in the manner as described above discharges its internal batteries of their respective communications device. Under certain circumstances, a NFC device may have to derive power from the magnetic field of another NFC device when the internal batteries of its respective communications device becomes too depleted. However, this magnetic field cannot provide adequate power for the conventional user interface. For example, this magnetic field cannot provide adequate power to operate a touch-screen of a mobile device into which a NFC is incorporated. Consequently, the operator of the communications device will no longer be able to operate and/or control the NFC device unless the internal batteries of its respective communications device are recharged.

Thus, there is a need to operate and/or control the NFC device when its internal batteries are so depleted that they can no longer provide adequate power for the conventional user interface. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 8A:
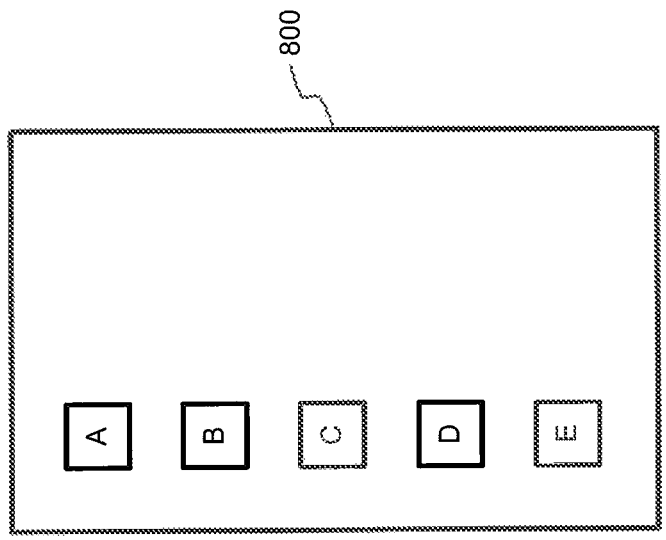
Figure 9:
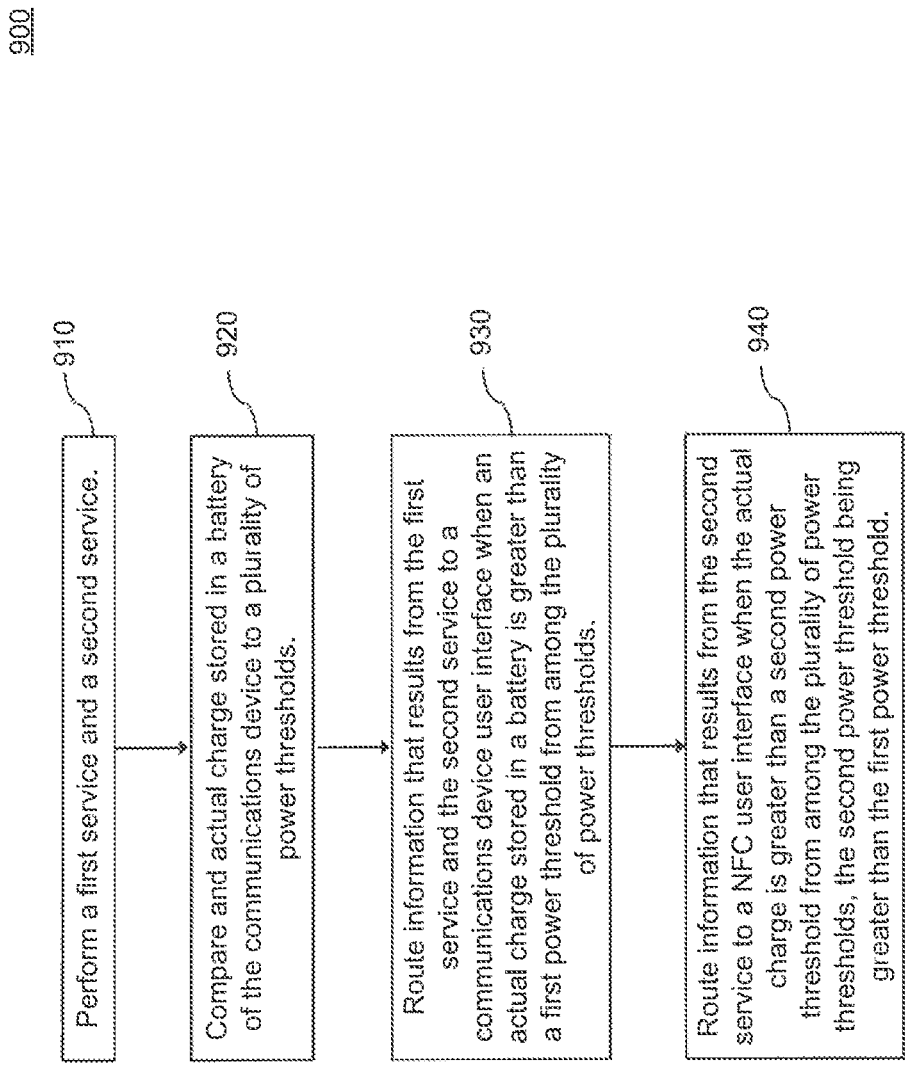
Figure 10:
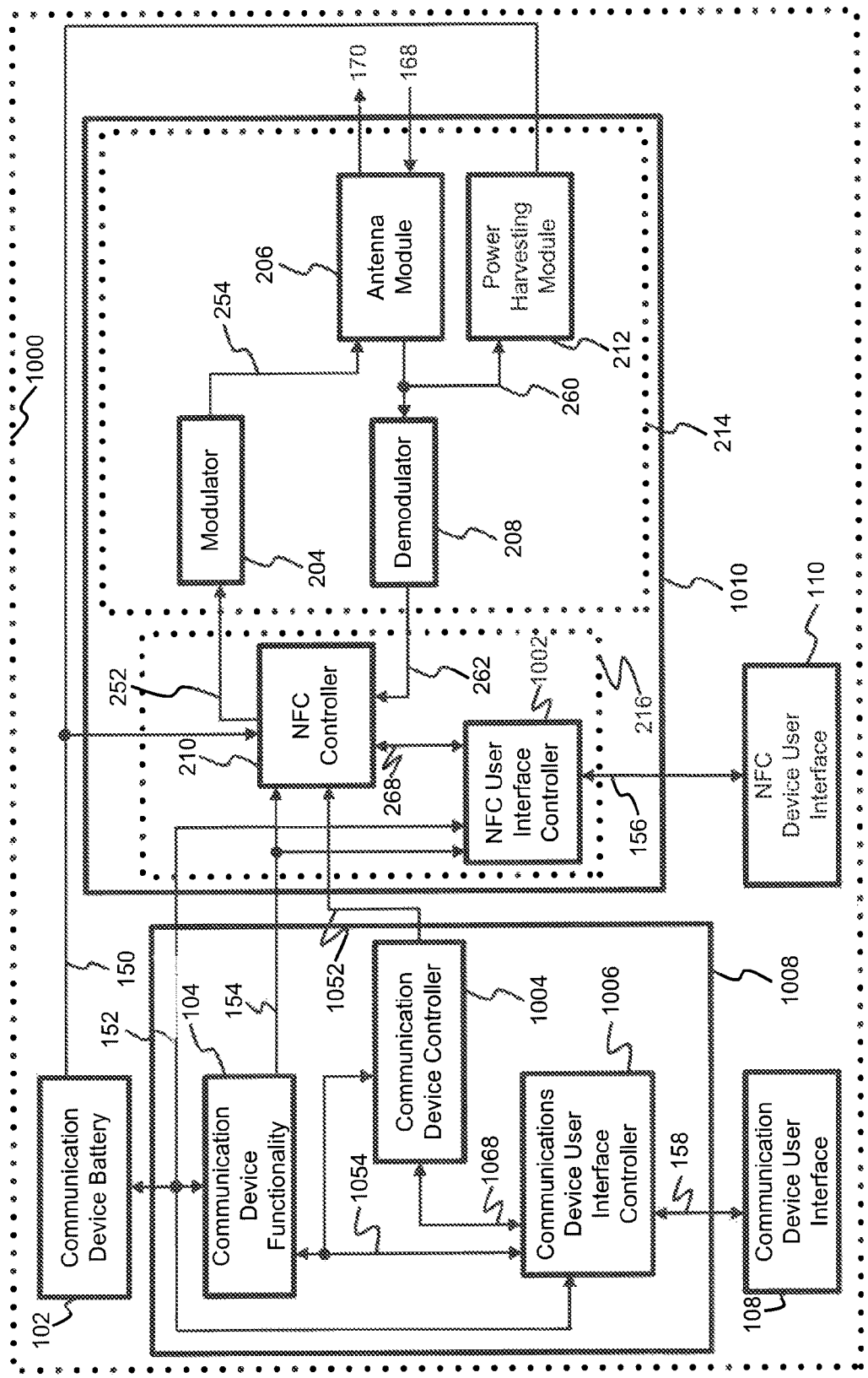

FIG. 8A graphically illustrates services that may be performed by the communications device according to an exemplary embodiment of the invention;

FIG. 8B graphically illustrates a first mapping of services to user interfaces according to an exemplary embodiment of the invention;

FIG. 8C graphically illustrates a second mapping of services to user interfaces according to an exemplary embodiment of the invention;

FIG. 8D graphically illustrates a third mapping of services to user interfaces according to an exemplary embodiment of the invention;

FIG. 8E graphically illustrates a fourth mapping of services to user interfaces according to an exemplary embodiment of the present invention;

FIG. 9 is a flowchart of exemplary operational steps of the user interface controller according to an exemplary embodiment of the present invention; and FIG. 10 illustrates a block diagram of a third communications device according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
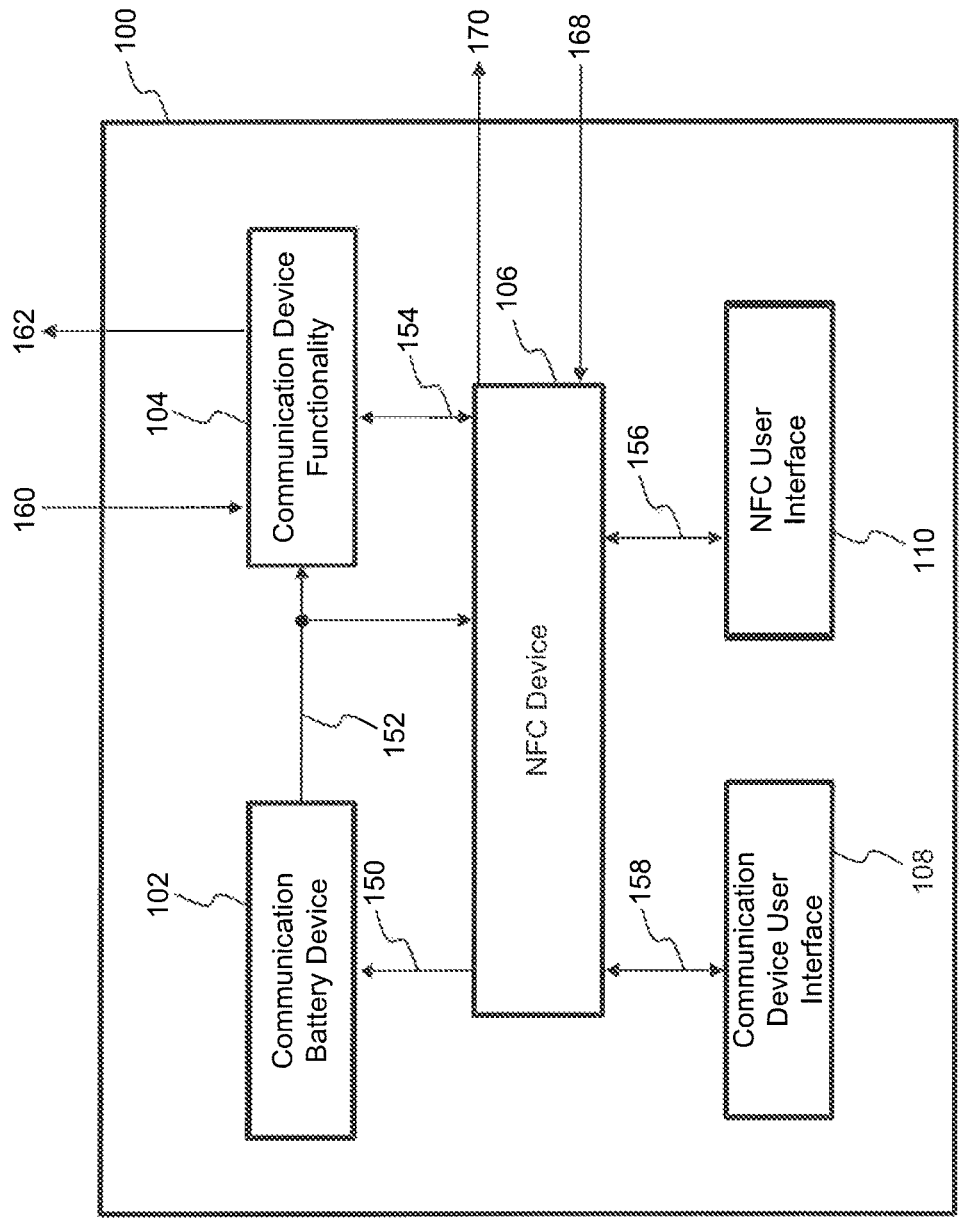
FIG. 1 illustrates a block diagram of a communications device according to an exemplary embodiment of the invention.

A First Exemplary Communications Device Having Near Field Communications Capabilities FIG. 1 illustrates a block diagram of a communications device according to an exemplary embodiment of the invention. A NFC device may be integrated within a communications device 100. The communications device 100 intelligently routes NFC data from a NFC device between multiple user interfaces based upon a power level of its internal batteries. The communications device 100 utilizes a communications device user interface to send and/or receive the NFC data from the NFC device when its internal batteries are sufficient to operate the communications device user interface. The communications device 100 begins to route some of this NFC data from being sent and/or received by the communications device user interface to a NFC user interface as its internal batteries deplete. Eventually, all of the NFC data will be sent to and/or received by the NFC user interface as the internal batteries of the communications device 100 become so depleted that they are unable to reliably operate the communications device user interface. The communications device 100 includes a communications device battery 102, communications device functionality 104, a NFC device 106, a communications device user interface 108, and a NFC user interface 110.

The communications device 100 may represent a mobile telephone, a portable computing device, other computing devices such as a personal, a laptop, or a desktop computer, a computer peripheral such as a printer, a portable audio and/or a video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and/or any other suitable electronic device that will be apparent to those skilled in the relevant art(s) without departing from the spirit and scope of the invention.

The communications device battery 102 provides power to the communications device 100. The communications device battery 102 may include one or more nickel-cadmium (NiCd), one or more nickel metal hydride (NiMH), and/or one or more lithium-ion (Li-ion) cells. However, this example is not limiting, those skilled in the relevant art(s) may implement the communications device battery 102 using other battery chemistries without departing from the scope and spirit of the present invention. The one or more cells of the communications device battery 102 convert chemical energy into electrical energy via an electrochemical reaction. The communications device 100 may reverse the electrochemical reaction allowing the communications device battery 102 to be restored or recharged. The communications device battery 102 may be restored or recharged using an external source and/or by harvesting power from a communications signal.

The communications device battery 102 provides a battery power indicator 152 to the NFC device 106 and the communications device functionality 104. The battery power indicator 152 represents charge stored in the communications device battery 102. For example, the battery power indicator 152 may represent an indicator of an actual charge that is stored in the communications device battery 102. The indicator may include multiple encoded bits that are representative of the actual power that is stored in the communications device battery 102. As another example, the battery power indicator 152 may be the actual charge that is stored in the communications device battery 102. The communications device battery 102 may also receive a harvested power 150 from the NFC device 106. The harvested power 150 represents power that may be derived or harvested from a communications signal such as the received communications signal 168 to provide an example and is to be described in further detail in FIG. 2.

As discussed above, the communications device 100 may be integrated with the NFC device 106. The communications device 100 may perform services in addition to those performed by the NFC device 106. The communications device functionality 104 represents these other functions that are supported by the communications device 100 which may include wireless communication, computing capabilities, and/or any other suitable functionality that will be apparent to those skilled in the relevant art(s) without departing from the spirit and scope of the present invention. The communications device functionality 104 may also support services relating to computing capabilities, such as Short Message Service (SMS), electronic mail, Internet access, gaming, short range wireless communications, camera, Multimedia Messaging Service (MMS) messaging, digital audio player, radio, and Global Positioning System (GPS) services and/or any other suitable service that will be apparent to those skilled in the relevant art(s) without departing from the spirit and scope of the present invention.

For example, as shown in FIG. 1, the communications device functionality 104 may receive a received communications signal 160 from another communications device. The communications device functionality 104 downconverts, demodulates, and/or decodes the received communications signal 160 to recover information, such as one or more commands to be executed by the communications device 100 and/or data to provide some examples, that is embedded within the received communications signal 160. The communications device functionality 104 provides this information to the NFC device 106 as the NFC device data 154 and/or to the services that are supported by the communications device functionality 104. As another example, the communications device functionality 104 may provide a transmitted communications signal 162 to another communications device. The communications device functionality 104 upconverts, modulates, and/or encodes information, such as one or more commands to be executed by another communications device and/or data to provide some examples, to provide the transmitted communications signal 162. The information may represent the NFC device data 154 that is provided by the NFC device 106 and/or information from the services that are supported by the communications device functionality 104. As a further example, the communications device functionality 104 may receive the received communications signal 160 and provide the transmitted communications signal 162 to another communications device.

The NFC device 106 interacts with another NFC capable device to exchange information, such as data and/or one or more commands to provide some examples, between the devices. The information may be received from the communications device functionality 104, the communication device user interface 108, and/or the NFC user interface 110, and/or may be produced by the NFC device 106 itself The NFC device 106 may operate according to an active communication mode and/or a passive communication mode. In the active communication mode, the NFC device 106 generates a magnetic field and modulates this magnetic field with the information to provide transmitted data communication 170. Otherwise, the NFC device 106 modulates a magnetic field that is provided by another NFC capable device with the information to provide the transmitted data communication 170 in the passive communication mode.

The NFC device 106 recovers information, such as data and/or one or more commands to be executed by the communications device 100 to provide some examples, from a received communications signal 168 from another NFC capable device. When the NFC device 106 is operating in the active communication mode, the other NFC capable device modulates the information onto the magnetic field that is generated by the NFC device 106. Otherwise, the other NFC capable device generates its own magnetic field and modulates this magnetic field with the information when the NFC device 106 is operating in the passive communication mode.

The NFC device 106 performs services in addition to those performed by the communications device functionality 104 that may be similar/dissimilar. The NFC device 106 intelligently routes information from the services performed by the NFC device 106 and/or the communications device functionality 104 to the communications device user interface 108 and/or the NFC user interface 110. Specifically, the NFC device 106 receives the battery power indicator 152 that indicates the actual charge that is stored in the communications device battery 102. The NFC device 106 also receives the harvested power 150 that indicates the power harvested from a communications signal such as the received communications signal 168. The NFC device 106 also receives the information that is embedded within the received communications signal 168 and/or the NFC device data 154. The NFC device 106 intelligently routes the information that is embedded within the received communications signal 168, the NFC device data 154, and/or information that is produced by the NFC device 106 itself to the communications device user interface 108 as communications device user interface data 158 and/or the NFC user interface 110 as the NFC user interface data 156 based upon the battery power indicator 152 and/or the harvested power 150.

In an exemplary embodiment, the communications device 100 does not include the communications device battery 102. In this exemplary embodiment, the NFC device 106 intelligently routes information to the NFC user interface 110 based upon the harvested power 150. In another exemplary embodiment, the NFC device 106 intelligently routes information based on the battery power indicator 152 as long as battery power indicator 152 indicates 152 an actual charge in the communications device battery 102. However, when the battery power indicator 152 indicates no actual charge in the communications device battery 102, the NFC device 106 intelligently routes information based on the harvested power 150.

For example, when the battery power indicator 152 indicates that the actual charge that is stored in the communications device battery 102 and the harvested power 150 is sufficient to operate the communications device user interface 108, the NFC device 106 routes the information that is embedded within the received communications signal 168, the NFC device data 154, and/or produced by the NFC device 106 itself to the communications device user interface 108. In this example, the communications device user interface 108 provides the operator with a full complement of services that may be performed by the communications device functionality 104 and/or the NFC device 106. The full complement of services may include, but are not limited to, dialing a phone number, composing a text message, verifying the time of day, verifying the date, verifying the power level of the batteries, composing an email, executing searches on the internet, taking a photograph, storing data, adjusting settings, verifying the status of a transaction, verifying the amount left in an account following the completion of a transaction and/or any other suitable service that will be apparent to those skilled in the relevant art(s) without departing from the spirit and scope of the present invention.

As another example, as the battery power indicator 152 begins to indicate that the actual charge that is stored in the communications device battery 102 is depleting, the NFC device 106 may begin to route at least some of the information that is embedded within the received communications signal 168, the NFC device data 154, and/or produced the NFC device 106 itself as the NFC user interface data 156 to the NFC user interface 110 based on the battery power indicator 152 and/or the harvested power 150. In this example, the information that is provided to the operator that relates to the complement of services that may be performed by the communications device functionality 104 and/or the NFC device 106 is split between the communications device user interface 108 and the NFC user interface 110.

As a further example, when the battery power indicator 152 indicates that the actual charge that is stored in the communications device battery 102 is unable to reliably operate the communications device user interface 108, the NFC device 106 routes the information that is embedded within the received communications signal 168, the NFC device data 154, and/or the information produced by the NFC device 106 itself to the NFC user interface 110 based on the harvested power 150. In this example, the NFC device transitions from routing the information based on the batter power indicator 152 and/or the harvested power 150 to routing the information based on the harvested power 150 alone. The NFC user interface 110 allows the operator to command and/or control the NFC device 106 to perform some services. The services available to the operator through the NFC user interface 110 may include, but are not limited to verifying the time of day, verifying the date, verifying the power level, verifying the transmission signal level, verifying the source of an incoming call, verifying the status of a transaction, verifying the amount left in an account following the completion of a transaction and/or any other suitable service that will be apparent to those skilled in the relevant art(s) without departing from the spirit and scope of the present invention.

As a yet farther example, in the exemplary embodiment that does not include the communications device battery 102, as discussed above, the battery power indicator 152 is unavailable. In this situation, the NFC device 106 essentially functions as it does when the communications device battery is unable to reliably operate the communications device user interface 108 as discussed above. The NFC device 106 routes the information that is embedded within the received communications signal 168, the NFC device data 154, and/or information produced by the NFC device 106 itself to the NFC user interface 110 based upon the harvested power 150. In this example, the NFC user interface 110 allows the operator to command and/or control the NFC device 106 to perform some services. The communications device user interface 108 receives the communications device user interface data 158 from the NFC device 106. The communications device user interface 108 operates as an output device to receive the communications device user interface data 158 from the NFC device 106. The communications device user interface data 158 may represent data to be displayed by the communications device user interface 108 and/or one or more commands to be executed by the communications device user interface 108. The communications device user interface 108 operates as an input device to receive information from the operator to be provided to the NFC device 106 as the communications device user interface data 158. The information from the operator may represent data from the operator and/or one or more commands to be executed by the communications device 100. The communications device user interface 108 may include a touch-screen display, an alphanumeric keypad, a microphone, a mouse, a speaker, any other suitable user interface that will be apparent to those skilled in the relevant art(s) without departing from the spirit and scope of the invention, or any combination thereof.

The NFC user interface 110 receives the NFC user interface data 156 from the NFC device 106. The NFC user interface 110 operates as an output device to receive the NFC user interface data 156 from the NFC device 106. The NFC user interface data 156 may represent data to be displayed by the NFC user interface 110 and/or one or more commands to be executed by the NFC user interface 110. The NFC user interface 110 operates as an input device to receive information from the operator to be provided to the NFC device 106 as the NFC user interface data 156. The information from the operator may represent data from the operator and/or one or more commands to be executed by the communications device 100. The NFC user interface 110 may include a touch-screen display, an alphanumeric keypad, a microphone, a mouse, a speaker, a single light emitting diode (LED), a digital LED display, a dot matrix display, a liquid crystal display (LCD) with or without a backlight, an organic light emitting diode (OLED), E Ink, and/or any other suitable user interface that is capable of reliably operating from power harvested from a communications signal that will be apparent to those skilled in the relevant art(s) without departing from the spirit and scope of the invention, or any combination thereof.

The communications device 100 is further described in International Standard ISO/IE 18092:2004(E), "Information Technology-Telecommunications and Information Exchange Between Systems-Near Field Communication-Interface and Protocol (NFCIP-1)," published on Apr. 1, 2004 and International Standard ISO/IE 21481:2005(E), "Information Technology-Telecommunications and Information Exchange Between Systems-Near Field Communication-Interface and Protocol-2 (NFCIP-2)," published on Jan. 15, 2005, each of which is incorporated by reference herein in its entirety.

A First Exemplary NFC Device

Figure 2:
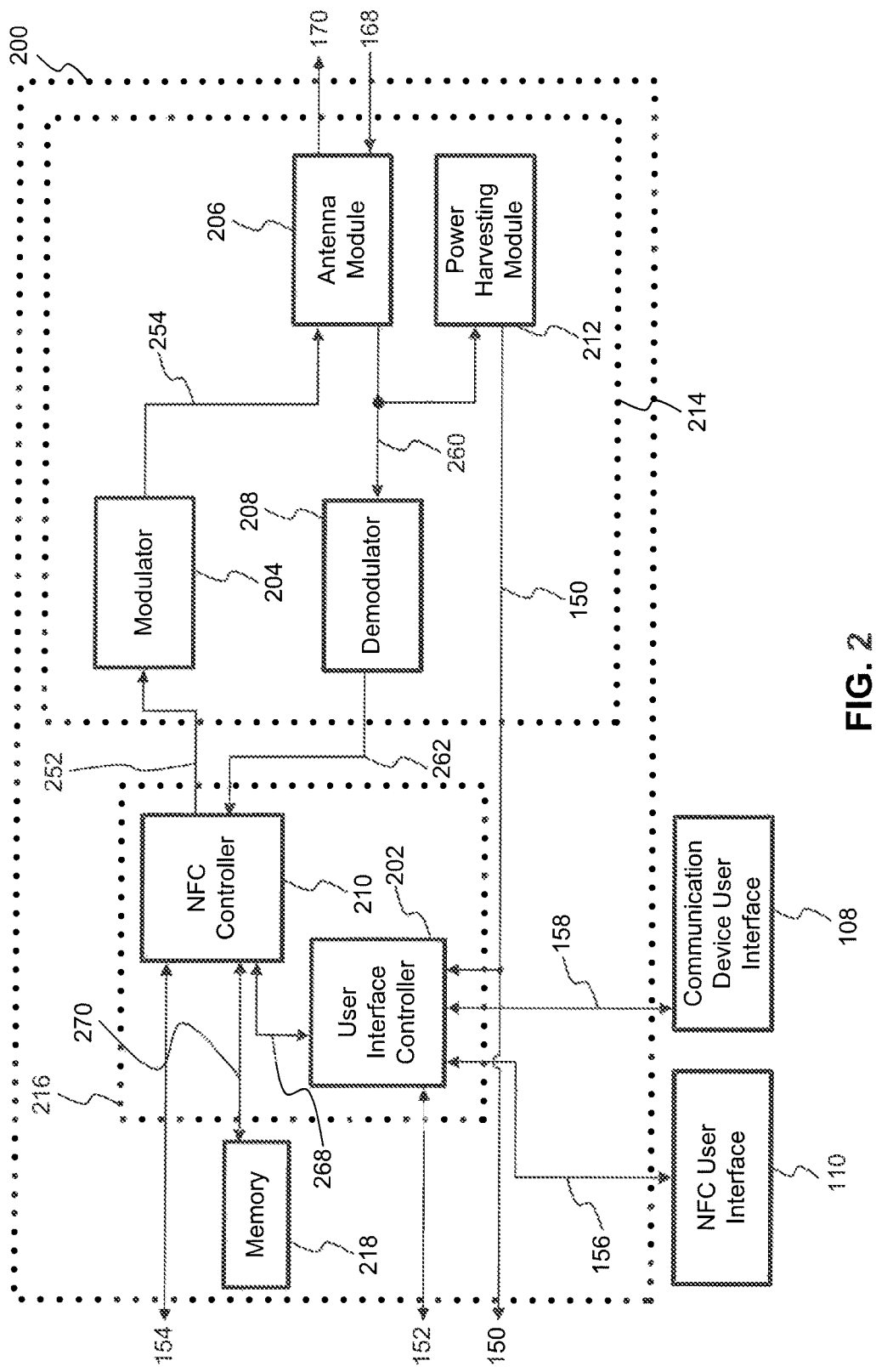
FIG. 2 illustrates a block diagram of a NFC device that is implemented as part of the communications device according to an exemplary embodiment of the invention.

FIG. 2 illustrates a block diagram of a NFC device that is implemented as part of the communications device according to an exemplary embodiment of the invention. A NFC device 200 interacts with other NFC devices to exchange information, such as data and/or one or more commands to be executed to provide some examples, as described above. The NFC device 200 intelligently routes the information that is embedded within the received communications signal 168, the NFC device data 154, and/or produced by the NFC device 200 itself between multiple user interfaces, such as the communications device user interface 108 and the NFC user interface 110, based upon the battery power indicator 152 and/or the harvested power 150. The NFC device 200 interfaces with the communications device user interface 108 when the battery power indicator 152 and/or the harvested power 150 indicate that internal batteries of the communications device may sufficiently operate the communications device user interface 108. The NFC device 200 begins to interface with the NFC user interface 110 when the battery power indicator 152 and/or the harvested power 150 indicate that the internal batteries of the communications device are beginning to deplete. Eventually, the NFC device 200 solely interfaces with the NFC user interface 110 when the battery power indicator 152 and/or the harvested power 150 indicate that internal batteries of the communications device have become so depleted that they are unable to reliably operate the communications device user interface 108. The NFC device 200 includes a NFC communications module 214, a NFC operational controller 216, and a memory 218. The NFC device 200 may represent an exemplary embodiment of the NFC device 106.

The NFC communications module 214 provides NFC communication capabilities with other NFC capable devices and/or other communication devices that have NFC capabilities. The NFC communications module 214 includes a modulator 204, a demodulator 208, an antenna module 206, and a power harvesting module 212.

The modulator 204 generates a radio frequency (RF) carrier and modulates transmission data 252 onto the RF carrier using any suitable analog or digital modulation technique to provide the modulated data 254 when no other substantial magnetic fields from other NFC capable devices are inductively coupled onto the antenna module 206. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). After modulating the transmission data 252 onto the RF carrier, the modulator 204 continues to provide the RF carrier as the modulated data 254 after modulating the transmission data 252 onto the RF carrier in the passive communication mode. In contrast, the modulator 204 ceases to provide the modulated data 254 after modulating the transmission data 252 onto the RF carrier in the active communication mode.

The antenna module 206 applies the modulated data 254 to an inductive coupling element, such as a resonant tuned circuit to provide an example, to generate a magnetic field to provide a transmitted data communication 170 when no other substantial magnetic fields from other NFC capable devices are inductively coupled onto the inductive coupling element. However, when other substantial magnetic fields are inductively coupled onto the inductive coupling element, the antenna module 206 may modulate these other substantial magnetic fields according to the modulated data 254 to provide the transmitted data communication 170. Typically, the antenna module 206 load modulates these other substantial magnetic fields according to the modulated data 254 to provide the transmitted data communication 170.

Other NFC capable devices may inductively couple a received communications signal 168 onto the inductive coupling element of the antenna module 206 to provide a recovered communications signal 260. For example, other NFC capable devices may apply their corresponding information to its corresponding magnetic field which is inductively coupled onto the antenna module 206 as the received communications signal 168 when other NFC communicators are operating in the active mode of communication. Alternatively, other NFC capable devices may modulate their corresponding information onto the magnetic field produced by the antenna module 206 to provide the received communications signal 168 when the other NFC capable devices are operating in the passive mode of communication.

The demodulator 208 demodulates the recovered communications signal 260 using any suitable analog or digital modulation technique to provide recovered information 262. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The power harvesting module 212 may derive or harvest power from the received communications signal 168. The power harvesting module 212 may derive or harvest power for the NFC device 200 from the received communications signal 168. The harvested power may include sufficient power to adequately operate the NFC device 200. However, the harvested power is insufficient to reliably operate the communications device user interface 108. Specifically, the power harvesting module 212 rectifies and/or regulates the received communications signal 168 to provide the harvested power 150. The harvested power 150 may represent a charging voltage and/or a charging current that is used to restore or recharge the internal batteries, such as the communications device battery 102, of the communications device. Alternatively, the harvested power 150 may represent a voltage and/or a current that is directly used to operate the NFC device 200.

The NFC operational controller 216 controls operation of the NFC device 200. The NFC operational controller 216 includes NFC controller 210 and user interface controller 202. The NFC controller 210 controls the overall operation and/or configuration of the NFC device 200, as well as other NFC capable devices. The NFC controller 210 processes the NFC device data 154 to properly route the information, such as one or more commands and/or data, embedded within the NFC device data 154 to user interface controller 202 as user interface information 268, NFC communications module 214 as the transmission data 252, and/or the memory 218 as NFC data 270. For example, the NFC controller 210 may issue and/or execute the one or more commands embedded within the NFC device data 154 to control the overall operation and/or configuration of the NFC communications module 214. The one or more commands may include a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC capable devices.

As another example, the NFC controller 210 may format the NFC data 270 into data frames for transmission to other NFC capable devices and may perform error encoding, such as cyclic redundancy check (CRC) to provide an example, on the data frames to provide the transmission data 252. The data frames may include frame delimiters to indicate a start and/or an end of each of the data frames. As a further example, the NFC controller 210 may parse the user interface information 268 and/or the NFC data 270 from the NFC device data 154. The NFC device data 154 may include a header of one or more bits as part of the information. The one or more bits of the header may be interpreted by the NFC controller 210 to determine whether to route the NFC device data 154 as the user interface information 268 to the user interface controller 202 and/or as the NFC data 270 to the memory 218.

Additionally, the NFC controller 210 processes the recovered information 262 to properly route the information, such as one or more commands and/or data, embedded within the recovered information 262 to the user interface controller 202 as user interface information 268, the NFC communications module 214 as the transmission data 252, and/or the memory 218 as the NFC data 270. For example, the NFC controller 210 may issue and/or execute the one or more commands embedded within the recovered information 262 to control overall operation and/or configuration of the NFC communications module 214. The one or more commands may include a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC devices. As another example, the NFC controller 210 may format the recovered information 262 into data frames for transmission to other NFC capable devices and may perform error decoding, such as cyclic redundancy check (CRC) to provide an example, on the data frames to provide the transmission data 252. The data frames may include frame delimiters to indicate a start and/or an end of each of the data frames. As a further example, the NFC controller 210 may parse the user interface information 268 and/or the NFC data 270 from the recovered information 262. The recovered information 262 may include a header of one or more bits as part of the information. The one or more bits of the header may be interpreted by the NFC controller 210 to determine whether to route the recovered information 262 as the user interface information 268 to the user interface controller 202 and/or as the NFC data 270 to the memory 218.

The memory 218 reads and/or writes the NFC data 270 based on commands from the NFC controller 210. The memory 218 may include a data store such as a transponder, a tag, a smartcard, read only memory (ROM), random access memory (RAM), magnetic disk storage media, optical storage media, flash memory devices and/or any other suitable machine-readable medium that will be apparent to those skilled in the relevant art(s) without departing from the spirit and scope of the invention that is communicatively coupled to the NFC controller 210.

The user interface controller 202 controls overall operation and/or configuration of the communications device user interface 108 and the NFC user interface 110. The user interface controller 202 processes the user interface information 268 to properly route the information, such as one or more commands and/or data, embedded within the user interface information 268 to the NFC user interface 110 as the NFC user interface data 156 and/or the communications device user interface 108 as the communications device user interface data 158. Specifically, the user interface controller 202 intelligently routes the information that is embedded within the user interface information 268 to the communications device user interface 108 as the communications device user interface data 158 and/or the NFC user interface 110 as the NFC user interface data 156 based upon the battery power indicator 152.

For example, when the battery power indicator 152 represents a charge sufficient to operate the communications device user interface 108, the user interface controller 202 routes the information embedded within the user interface information 268 as the communications device user interface data 158 to the communications device user interface 108. As another example, when the battery power indicator 152 indicates a depleting charge, the user interface controller 202 begins to route at least some of the information that is embedded within the user interface information 268 as the NFC user interface data 156 to the NFC user interface 110. As a further example, when the battery power indicator 152 indicates a charge that is insufficient to reliably operate the communications device user interface 108, the user interface controller 202 routes the information that is embedded within the user interface information 268 to the NFC user interface 110 as the NFC user interface data 156.

The communications device user interface 108 and the NFC user interface 110 route information, such as one or more commands and/or data, from the operator as the communications device user interface data 158 and the NFC user interface data 156, respectively, to the user interface controller 202. Specifically, the user interface controller 202 receives the communications device user interface data 158 and the NFC user interface data 156 and routes this information to the NFC controller 210 as the user interface information 268. For example, the user interface controller 202 may interleave the communications device user interface data 158 and the NFC user interface data 156 to provide the user interface information 268.

Although not illustrated in FIG. 2, the NFC device 200 may perform other suitable functions as further described in International Standard ISO/IE 18092:2004(E), "Information Technology-Telecommunications and Information Exchange Between Systems-Near Field Communication-Interface and Protocol (NFCIP-1)," published on Apr. 1, 2004 and International Standard ISO/IE 21481:2005(E), "Information Technology-Telecommunications and Information Exchange Between Systems-Near Field Communication-Interface and Protocol-2 (NFCIP-2)," published on Jan. 15, 2005, each of which is incorporated by reference herein in its entirety.

Typically, the NFC device 200 is implemented on a first common chip or die. The first common chip includes at least the NFC communications module 214 and the NFC operational controller 216. The communications device functionality 104 is implemented on a second common chip or die. The first and/or the second common chips or dies may include one or more chips or dies. However, it should be noted that the NFC device 200 and the communications device functionality 104 may be implemented on a single common chip or die.

An Exemplary User Interface Controller

Figure 3:
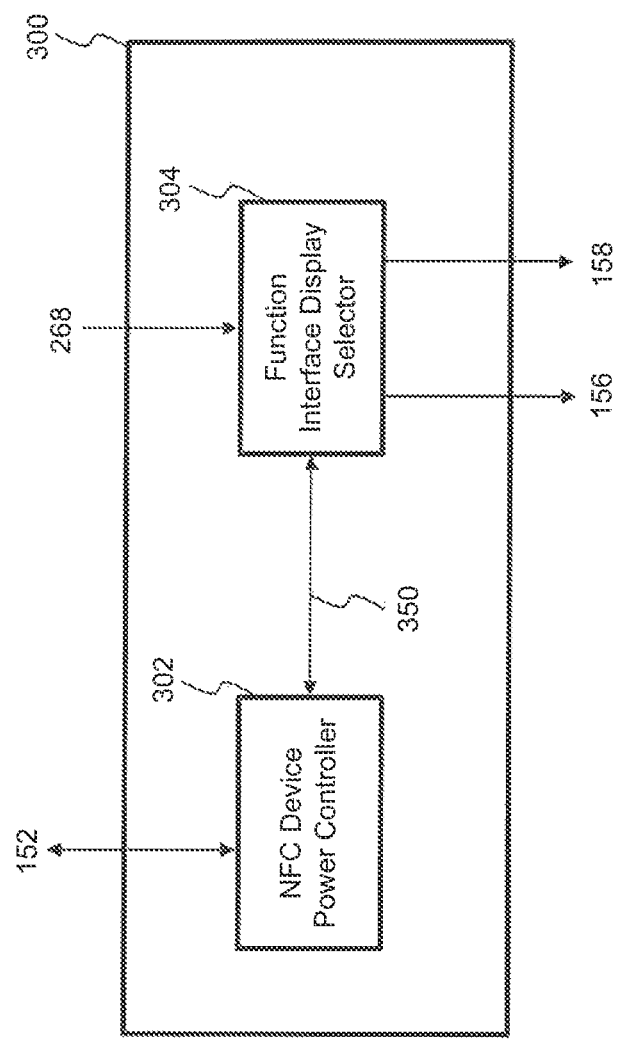
FIG. 3 illustrates a block diagram of a user interface controller that is implemented as part of the NFC device according to an exemplary embodiment of the invention.

FIG. 3 illustrates a block diagram of a user interface controller that is implemented as part of the NFC device according to an exemplary embodiment of the invention. A user interface controller 300 controls the overall operation and/or configuration of the communications device user interface 108 and/or the NFC user interface 110, as described above. The user interface controller 300 processes the user interface information 268 to properly route the information, such as one or more commands and/or data, embedded within the user interface information 268 to the NFC user interface 110 as the NFC user interface data 156 and/or the communications device user interface 108 as the communications device user interface data 158. Specifically, the user interface controller 300 intelligently routes the information that is embedded within the user interface information 268 to the communications device user interface 108 as the communications device user interface data 158 and/or the NFC user interface 110 as the NFC user interface data 156 based upon the battery power indicator 152. The user interface controller 300 includes a NFC device power controller 302 and a function interface display selector 304. The user interface controller 300 may represent an exemplary embodiment of the user interface controller 202.

The NFC device power controller 302 monitors the battery power indicator 152 to determine the actual charge that is stored in the communications device battery 102 to provide user interface power 350. As an example, the user interface power 350 may represent an indicator of the actual charge that is stored in the communications device battery 102. The indicator may include multiple encoded bits that are representative of the actual charge that is represented by the user interface power 350. Alternatively, the user interface power 350 may be the actual charge that is stored in the communications device battery 102.

The user interface power 350 may not be limited to communicating the battery power indicator 152 for an instantaneous moment. Rather, the battery power indicator 152 may fluctuate as the operator interfaces with the communications device user interface 108 and/or the NFC user interface 110. The user interface power 350 continuously updates the function interface display selector 304 as to the battery power indicator 152. Alternatively, the user interface power 350 may periodically update the function interface display selector 304 as to the battery power indicator 152.

The function interface display selector 304 processes the user interface information 268 to intelligently route the information, such as one or more commands and/or data, embedded within the user interface information 268 to the NFC user interface 110 as the NFC user interface data 156 and/or the communications device user interface 108 as the communications device user interface data 158 based upon the user interface power 350. Specifically, the function interface display selector 304 compares the user interface power 350 to one or more power thresholds to determine how to route information that is embedded within the user interface information 268 to the communications device user interface 108 and/or the NFC user interface 110.

Typically, the one or more power thresholds are assigned to various levels of services that may be performed by the communications device user interface 108 and/or the NFC user interface 110. For example, a first power threshold from among the one or more power thresholds may be assigned to a first level of services and a second power threshold from among the one or more power thresholds may be assigned to a second level of services, the second level of services may include more services than the first level of services. In this example, the function interface display selector 304 routes information that is embedded within the user interface information 268 to the communications device user interface 108 and/or the NFC user interface 110 to execute the first level of services when the user interlace power 350 is less than or equal to the first power threshold. Alternatively, the function interface display selector 304 routes information that is embedded within the user interface information 268 to the communications device user interface 108 and/or the NFC user interface 110 to execute the second level of services when the user interface power 350 is less than or equal to the second power threshold.

A Second Exemplary Communications Device

Figure 4:
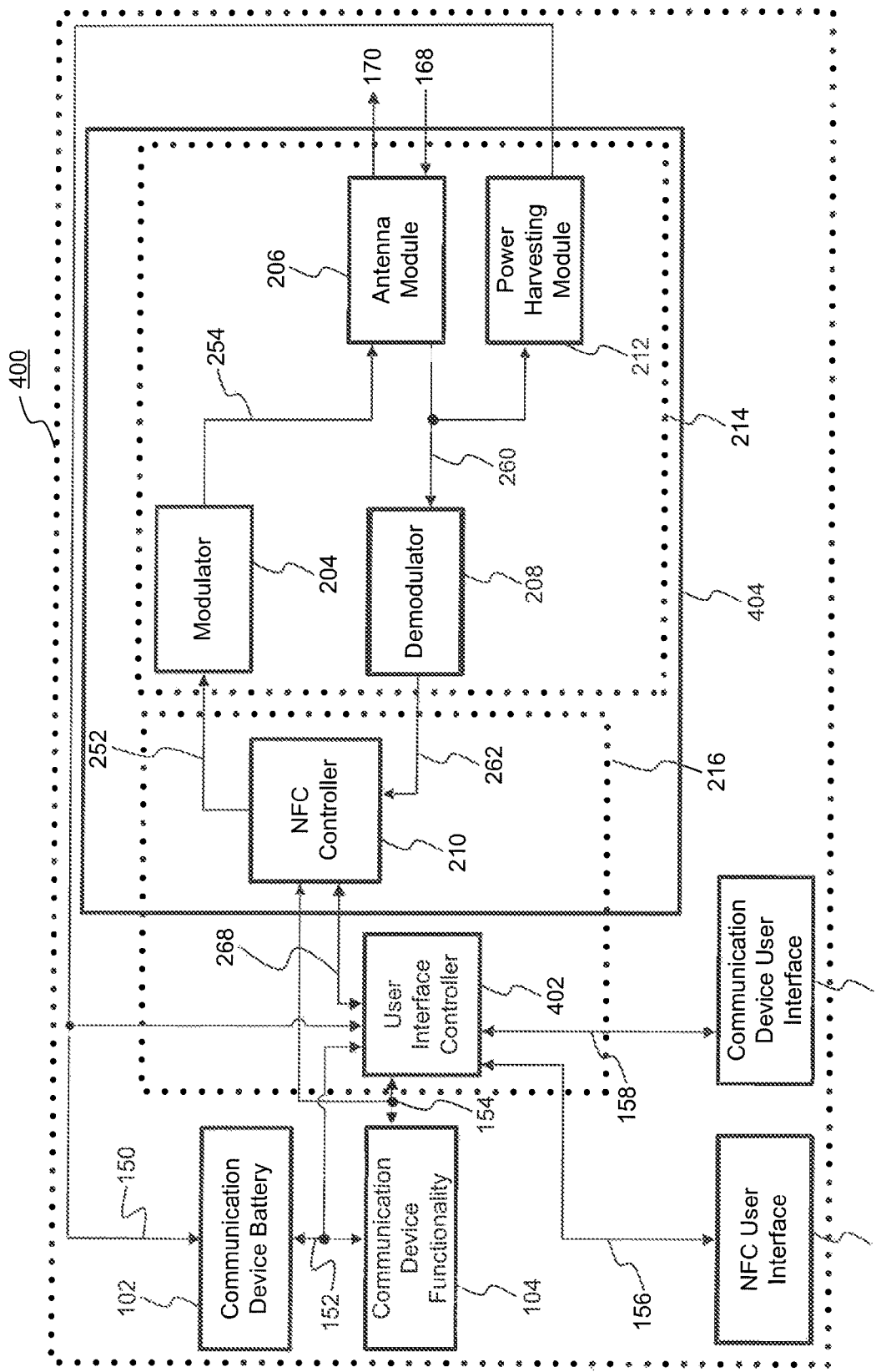
FIG. 4 illustrates a block diagram of a second communications device according to an exemplary embodiment of the invention.

FIG. 4 illustrates a block diagram of a second communication device according to an exemplary embodiment of the invention. As discussed above, the NFC device 200 is implemented on the first common chip or die that includes at least the NFC communications module 214, and the NFC controller 210. However, in this exemplary embodiment, the user interface controller 202 is implemented as part of the second common chip or die along with the communications device functionality 104 to form a communications device 400. The communications device 400 includes a NFC device 404, a user interface controller 402, the communications device battery 102, the communications device functionality 104, the NFC user interface 110, and the communications device user interface 108. The communications device 400 shares many similar features with the communications device 100; therefore, the only differences between the communications device 100 and the communications device 400 are to be discussed in further detail.

The NFC device 404 includes the NFC communications module 214 and the NFC controller 210 as discussed above. The user interface controller 402 controls the overall operation and/or configuration of the communications device user interface 108 and the NFC user interface 110 in a substantially similar manner as the user interface controller 202. As discussed above, the NFC device 200 is implemented on the first common chip or die that includes at least the NFC communications module 214 and the NFC operational controller 216 while the communications device functionality 104 is implemented on the second common chip or die. However, as illustrated in FIG. 4, the NFC device 404 is implemented on the first common chip or die and at least the communications device functionality 104 and the user interface controller 402 is implemented on the second common chip or die.

A Third Exemplary Communications Device

FIG. 10 illustrates a block diagram of a third communications device according to an exemplary embodiment of the invention. As discussed above, the NFC device 200 is implemented on the first common chip or die that includes at least the NFC communications module 214, and the NFC controller 210. Also as discussed above, the user interface controller 202 intelligently routes the user interface information 268 to the communications device user interface 108 and the NFC user interface 110. However, in this exemplary embodiment, the NFC controller 210 is implemented as part of the first common chip or die along with a NFC user interface controller 1002 and the NFC communications module 214 to form a NFC device 1010. The communications device functionality 104 is implemented as part of the second chip or die with a communications device controller 1004 and a communications device user interface controller 1006 to form a communications control device 1008. The NFC device 1010 and the communications control device 1008 form the communications device 1000. The communications device 1000 shares many similar features with the communications device 100; therefore, the only differences between the communications device 100 and the communications device 1000 are to be discussed in further detail.

The NFC device 1010 includes the NFC communications module 214 and the NFC controller 210 as discussed above along with the NFC user interface controller 1002. The NFC user interface controller 1002 controls the overall operation and/or configuration of the NFC user interface 110 in a substantially similar manner as the user interface controller 202.

The NFC user interface controller 1002 controls the overall operation and/or configuration of the NFC user interface 110. The NFC user interface controller 1002 processes the user interface information 268 to properly route the information, such as one or more commands and/or data, embedded within the user interface information 268 to the NFC user interface 110 as the NFC user interface data 156. Specifically, the NFC user interface controller 1002 intelligently routes the information that is embedded within the user interface information 268 to the NFC user interface 110 as the NFC user interface data 156 based upon the battery power indicator 152.

The communications control device 1008 includes the communications device functionality 104 as discussed above along with the communications device controller 1004 and the communications device user interface controller 1006. The communications device controller 1004 is similar to the NFC controller 210 in that the communications device controller 1004 controls the overall operation and/or configuration of the communications device 1008. The communications device controller 1004 processes the communications device data 1054 to properly route the information, such as one or more commands and/or data embedded within the communications device data 1054 to the communications device user interface controller 1006 as the communications device user interface information 1068 and/or the communications device controller output data 1052.

As does the NFC device data 154, the communications device data 1054 represents the information for the services supported by the communications device functionality 104. The communications device controller output data 1052 represents the data formatted for the NFC controller 210 so that the NFC controller 210 may format the communications device controller output data 1052 into data frames to form the transmission data 252. The communications device controller output data 1052 may include data received from the communications device data 1054 and/or the communications device user interface information 1068.

The communications device user interface controller 1006 is similar to the user interface controller 202 in that the communications device user interface controller 1006 controls the overall operation and/or configuration of the communications device user interface 108. The communications device user interface controller 1006 processes the communications device user interface information 1068 to properly route the information, such as one or more commands and/or data, embedded within the communications device user interface information 1068 to the communications device user interface 108 as the communications device user interface data 158. Specifically, the communications device user interface controller 1006 intelligently routes the information that is embedded within the communications device user interface information 1068 to the communications device user interface data 158 based upon the battery power indicator 152.

As discussed above, the NFC device 200 is implemented on the first common chip or die that includes at least the NFC communications module and the NFC operational controller 216 while the communications device functionality 104 is implemented on the second common chip or die. However, as illustrated in FIG. 10, the NFC device 1010 is implemented on the first common chip or die and at least the communications control device is implemented on the second common chip or die.

Figure 6:
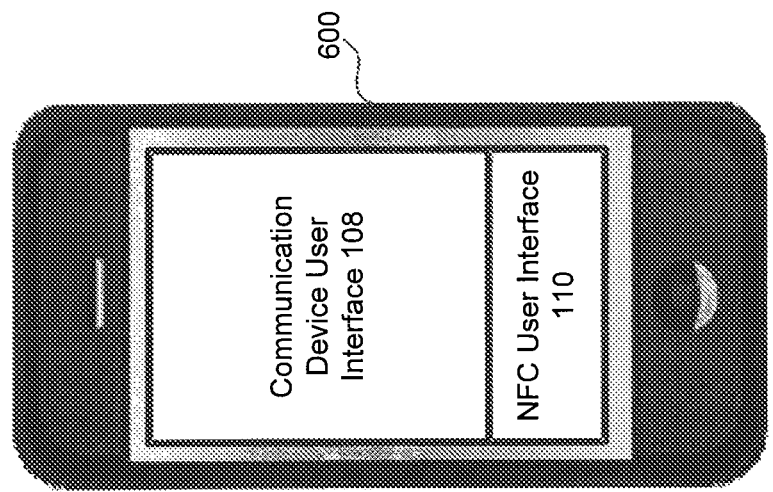
FIG. 6 illustrates a third communications device that includes a communications device user interface and a NFC user interface that share the main display of the communications device according to an exemplary embodiment of the invention.

Examples of a Communications Device with a Communications Device User Interface and a NFC User Interface FIG. 6 illustrates a communications device that illustrates a first exemplary arrangement of the communications device user interface and the NFC user interface according to an exemplary embodiment of the present invention. As illustrated in FIG. 6, the communications device user interface 108 and the NFC user interface 110 are both implemented on a single side of a communication device 600. For example, the communications device user interface 108 may be implemented above the NFC user interface 110.

Figure 7:
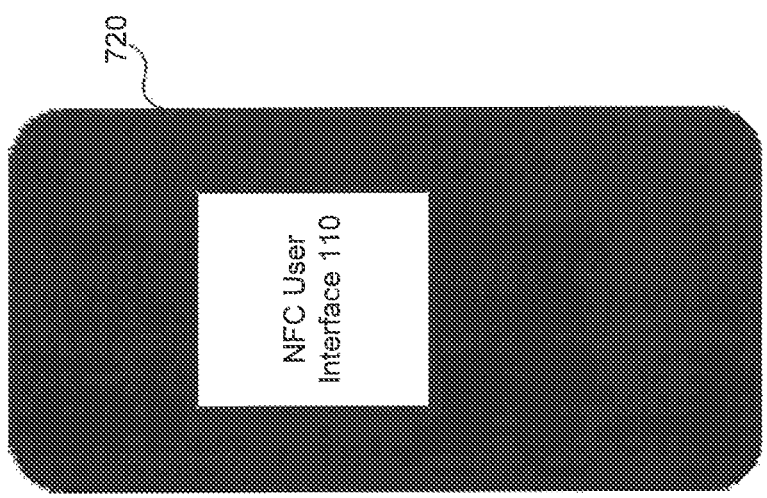
FIG. 7 illustrates a fourth communications device according to an exemplary embodiment of the invention.
Figure 7:
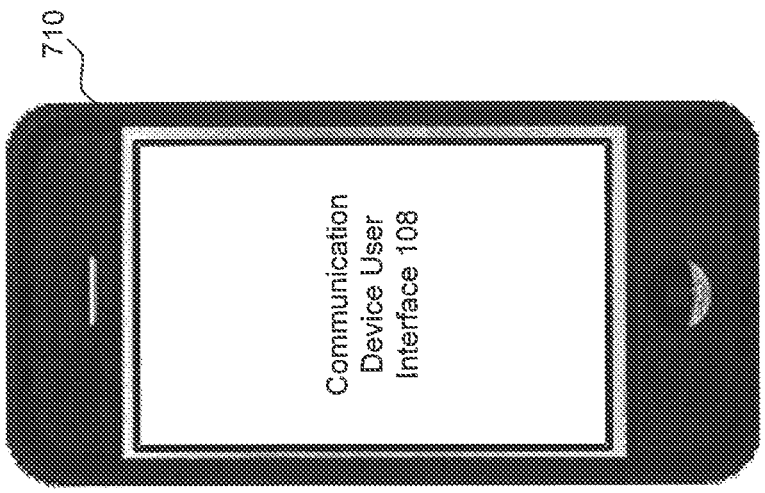

FIG. 7 illustrates a communications device that illustrates a second exemplary arrangement of the communications device user interface and the NFC user interface according to an exemplary embodiment of the present invention. As illustrated in FIG. 7, the communications device user interface 108 is implemented on a first side 710 of a communications device 700 and the NFC user interface 110 is implemented on a second side of the communication device 700. For example, the communications device user interface 108 may be implemented on a front side of the communications device 700 and the NFC user interface 110 may be implemented on a back side of the communications device 700.

Exemplary Embodiments of NFC User Interfaces

Figure 5A:
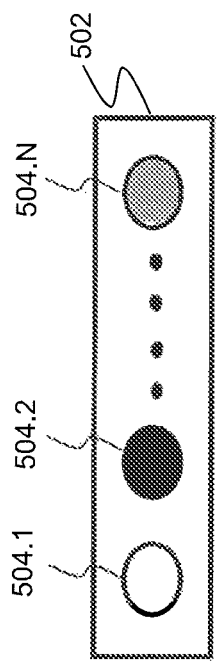
FIG. 5A illustrates a first exemplary NFC user interface that is implemented within a communications device according to an exemplary embodiment of the invention.

FIG. 5A illustrates a first exemplary NFC user interface that is implemented within a communications device according to an exemplary embodiment of the invention. A NFC user interface 502 includes light emitting diodes (LEDs) 504.1 through 504.N. However, those skilled in the relevant art(s) will recognize that the NFC user interface 502 may only include LED 504.1 without departing from the spirit and scope of the present invention. The NFC user interface 502 may represent an exemplary embodiment of the NFC user interface 110.

The NFC user interface 502 may be characterized as an output device to display information relating to the services provided by the NFC user interface 502 to the operator. Specifically, the LEDs 504.1 through 504.N may be configured to illuminate one or more colors by turning on and to stop illuminating the one or more colors by turning off. Such functionality consumes minimum harvested power 150 but still providing minimal interface capability to the operator. For example, the LEDs 504.1 through 504.N may turn on to illuminate the one or more colors, or turn off to stop illuminating the one or more colors, and do so in any number of combinations to communicate data to the operator. Each combination of the LEDs 504.1 through 504.N that lights up or turns off communicates a different status to the operator.

The LEDs 504.1 through 504.N may be configured to illuminate similar or dissimilar colors, such as red, green, yellow, orange, blue, or any other suitable color that will be apparent to those skilled in the relevant art(s). Each color or combination of colors may communicate status information from the NFC device to the operator. For example, the communications device 100 and/or the communications device 400 may be used by the operator to complete a transaction. As the operator executes the transaction, the NFC user interface 502 communicates to the operator the status of the transaction. If the transaction fails, then one or more of the LEDs 504.1 through 504.N may be configured to illuminate a red color to indicate to the operator that the transaction failed. Otherwise, one or more of the LEDs 504.1 through 504.N may be configured to illuminate a green color to indicate to the operator that the transaction was successful.

Figure 5B:
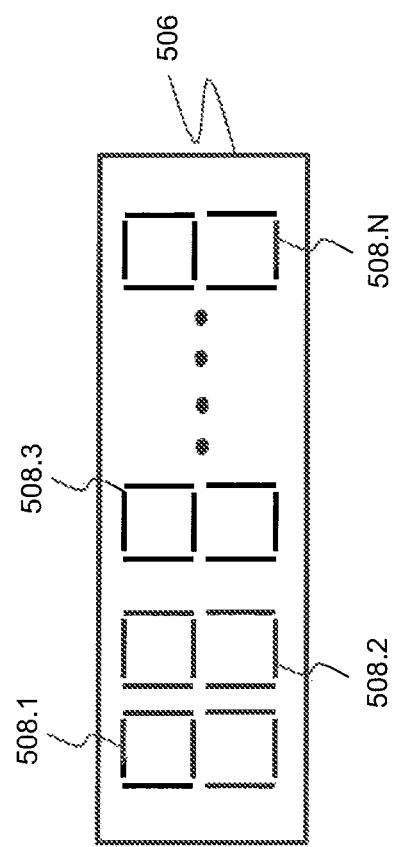
FIG. 5B illustrates a second exemplary NFC user interface that is implemented within a communications device according to an exemplary embodiment of the invention.

FIG. 5B illustrates a second exemplary NFC user interface that is implemented within the communications device according to an exemplary embodiment of the invention. A NFC user interface 506 includes digital combination LEDs 508.1 through 508.N. However, those skilled in the relevant art(s) will recognize that the NFC user interface 506 may only include digital combination LED 508.1 without departing from the spirit and scope of the present invention. The NFC user interface 506 may represent an exemplary embodiment of the NFC user interface 110.

The NFC user interface 506 may be characterized as an output device to display information relating to the services provided by the NFC user interface 502 to the operator. Specifically, each of the digital combination LEDs 508.1 through 508.N may include one or more LEDs that may be illuminated in various combinations to form one or more alphanumeric characters. Typically, the one or more alphanumeric characters include numbers 0 to 9, letters A to Z, and/or any other suitable character or symbol that will be apparent to those skilled in the relevant art(s) without departing from the spirit and scope of the present invention. Typically, the one or more LEDs of each of digital combination LEDs 508.1 through 508.N may turn on to illuminate similar or dissimilar colors, such as red, green, yellow, orange, blue, or any other suitable color that will apparent to those skilled in the relevant art(s) or turn off to stop illuminating the one or more colors, and do so in any number of combinations to form the one or more alphanumeric characters.

For example, the communications device 100 and/or the communications device 400 may be used by the operator to complete a transaction. As the operator executes the transaction, the NFC user interface 506 communicates to the operator the status of the transaction. If the transaction fails, then one or more of the digital combination LEDs 508.1 through 508.N may be configured to illuminate an alphanumeric word and/or phrase, such as "incomplete", "unsuccessful", or "failed" to provide some examples, to indicate to the operator that the transaction failed. Otherwise, one or more of the digital combination LEDs 508.1 through 508.N may be configured to illuminate another alphanumeric word and/or phrase, such as "complete", "success", or "pass" to provide some examples the operator that the transaction was successful.

Figure 5C:
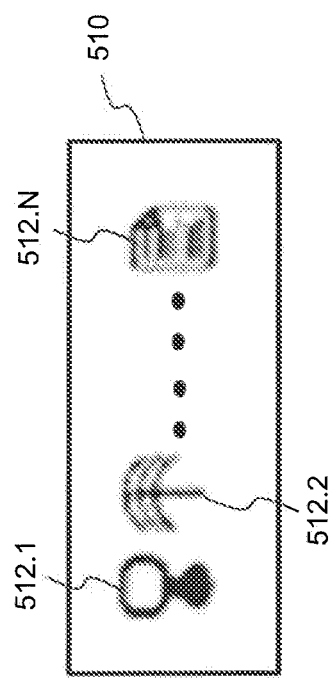
FIG. 5C illustrates a third exemplary NFC user interface that is implemented within a communications device according to an exemplary embodiment of the invention.

FIG. 5C illustrates a third exemplary NFC user interface that is implemented within the communications device according to an exemplary embodiment of the invention. A NFC user interface 510 includes symbols 512.1 through 512.N. However, those skilled in the relevant art(s) will recognize that the NFC user interface 510 may only include symbol 512.1 without departing from the spirit and scope of the present invention. The NFC user interface 510 may represent an exemplary embodiment of the NFC user interface 110.

The NFC user interface 510 may be characterized as an output device to display information relating to the services provided by the NFC user interface 510 to the operator. Each of the symbols 512.1 through 512.N may include one or more predetermined symbols that may be illuminated in various combinations to convey information to the operator. Typically, the one or more predetermined symbols include symbols that are related to the services being provided by the NFC user interface 510. For example, a first symbol 512.1 may illuminate to indicate that the actual charge that is stored in the communications device battery 102 is unable to reliably operate the communications device user interface 108. As another example, a second symbol 512.2 may illuminate to indicate that another NFC device has been detected. As a further example, a third symbol 512.N may illuminate to indicate a transfer of information to another NFC device. However, these examples are not limiting, those skilled in the relevant art(s) will recognize that predetermined are possible without departing from the spirit and scope of the present invention.

Alternatively, the symbols 512.1 through 512.N may represent various symbols that are provided to the NFC device for display on the NFC user interface 510. These symbols represent dynamic symbols that may be provided to the NFC user interface 510 by the NFC device for display. For example, the communications device 100 and/or the communications device 400 may be used by the operator to complete a transaction. As the operator executes the transaction, the NFC device may provide a first symbol for display by the NFC user interface 510 to indicate that the NFC device is in the process of transferring information to another NFC capable device. The NFC device may provide a second symbol for display by the NFC user interface 510 to indicate that the transaction has failed or a third symbol for display by the NFC user interface 510 to indicate that the transaction was successful.

Figure 5D:
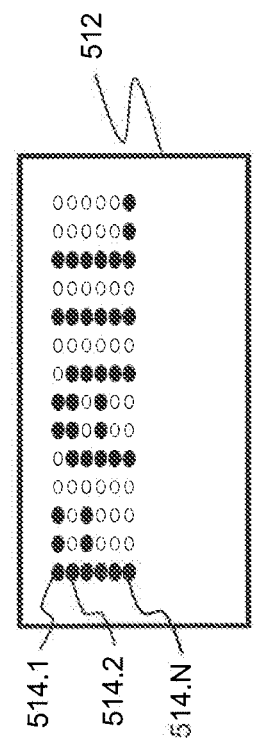
FIG. 5D illustrates a fourth exemplary NFC user interface that is implemented within a communications device according to an exemplary embodiment of the invention.

FIG. 5D illustrates a fourth exemplary NFC user interface that is implemented within the communications device according to an exemplary embodiment of the invention. A NFC user interface 512 may be characterized as providing more services when compared to the NFC user interface 510 to allow the operator to receive more data, such as status information to provide an example, from a NFC device, such as the NFC Device 106 or the NFC Device 404 to provide some examples, when compared to the NFC user interface 506. Typically, the NFC user interface 506 may be characterized as consuming more power when compared to the NFC user interface 512. The NFC user interface 506 includes LEDs 514.1 through 514.N that are configured and arranged to form a grid of LEDs. The NFC user interface 506 may represent an exemplary embodiment of the NFC user interface 110.

The NFC user interface 512 may be characterized as an output device to display information relating to the services provided by the device to the operator. Specifically, each of the LEDs 514.1 through 514.N may include and/or may be illuminated in various combinations to form one or more alphanumeric characters. Typically, the one or more alphanumeric characters include numbers 0 to 9, letters A to Z, and/or any other suitable character or symbol that will be apparent to those skilled in the relevant art(s) without departing from the spirit and scope of the present invention. Typically, the LEDs 514.1 through 514.N may turn on to illuminate similar or dissimilar colors, such as red, green, yellow, orange, blue, or any other suitable color that will apparent to those skilled in the relevant art(s) or turn off to stop illuminating the one or more colors, and do so in any number of combinations to form the one or more alphanumeric characters.

For example, the communications device 100 and/or the communications device 400 may be used by the operator to complete a transaction. As the operator executes the transaction, the NFC user interface 506 communicates to the operator the status of the transaction. If the transaction fails, the LEDs 514.1 through 514.N may be configured to illuminate an alphanumeric word and/or phrase, such as "fail" as illustrated in FIG. 5D, to indicate to the operator that the transaction failed. Otherwise the digital combination LEDs 514.1 through 514.N may be configured to illuminate another alphanumeric word and/or phrase, such as "pass" to provide an example, to indicate to the operator that the transaction was successful.

Those skilled in the relevant art(s) will recognize that combinations of the NFC user interface 502, the NFC user interface 506, the NFC user interface 510, NFC user interface 512 may be used to form other embodiments of the NFC user interface 110 without departing from the spirit and scope of the present invention. For example, different combinations of the LEDs 504.1 through 504.N, the combination LEDs 508.1 through 508.N, the symbols 512.1 through 512.N, and/or the LEDs 514.1 through 514.N may be used to form other embodiments of the NFC user interface 110.

A Second Exemplary User Interface Controller

FIG. 8A graphically illustrates services that may be performed by the communications device according to an exemplary embodiment of the present invention. A communications device, such as the communications device 100 or the communications device 400 to provide some examples, may be configured to offer various services to the operations. As illustrated in FIG. 8A, the services offered by the communications device include a complement of services A through E. However, this example for illustrative purposes only, those skilled in the relevant art(s) will recognize that the communications device may be configured to offer more or less services without departing from the spirit and scope of the present invention.

The complement of services A through E may include, but are not limited to, dialing a phone number, composing a text message, verifying the time of day, verifying the date verifying the power level of the batteries, composing an email, executing searches on the internet, taking a photograph, storing data, adjusting settings, verifying the status of a transaction, verifying the amount left in an account following the completion of a transaction and/or any other suitable service that will be apparent to those skilled in the relevant art(s) without departing from the spirit and scope of the present invention.

One or more of the complement of services A through E may be represent single capable services that are performed only by communications device functionality, such as the communications device functionality 104 to provide an example, that is integrated within the communications device. However, one or more of the complement of services A through E may represent dual capable services that may be performed by the communications device functionality and/or a NFC device, such as the NFC device 106 or the NFC device 400 to provide some examples, that is integrated within the communications device. For illustrative purposes only, the service A is characterized as being the single capable service and the services B through E are characterized as being the dual capable services in the description of FIG. 8B through 8E as to be described below.

FIG. 8B graphically illustrates a first mapping of services to user interfaces according to an exemplary embodiment of the present invention. A user interface controller, such as the user interface controller 202 to provide an example, intelligently routes the information from the complement of services A through E to the communications device user interface 108 when the battery power indicator 152 indicates the actual charge that is stored in the communications device battery 102 is at a first level. The operator may use the communications device user interface 108 to receive information, such as one or more commands and/or data to provide some examples, from the complement of services A through E. The operator may also use the communications device user interface 108 to provide information, such as one or more commands and/or data to provide some examples, to the complement of services A through E.

FIG. 8C graphically illustrates a second mapping of services to user interfaces according to an exemplary embodiment of the present invention. The user interface controller, such as the user interface controller 202 to provide an example, intelligently routes the information from the complement of services A through E to the communications device user interface 108 and/or the NFC user interface 110 when the battery power indicator 152 indicates the actual charge that is stored in the communications device battery 102 is at a second level. The operator may use the communications device user interface 108 to receive information, such as one or more commands and/or data to provide some examples, from the complement of services A through D. The operator may also use the communications device user interface 108 to provide information, such as one or more commands and/or data to provide some examples, to the complement of services A through D. Similarly, the operator may use the NFC user interface 110 to receive information, such as one or more commands and/or data to provide some examples, from the service E. The operator may also use the NFC user interface 110 to provide information, such as one or more commands and/or data to provide some examples, to the service E.

FIG. 8D graphically illustrates a third mapping of services to user interfaces according to an exemplary embodiment of the present invention. The user interface controller, such as the user interface controller 202 to provide an example, intelligently routes the information from the complement of services A through E to the communications device user interface 108 and/or the NFC user interface 110 when the battery power indicator 152 indicates the actual charge that is stored in the communications device battery 102 is at a $(n-1)^{th}$ level. The operator may use the communications device user interface 108 to receive information, such as one or more commands and/or data to provide some examples, from the services A. The operator may also use the communications device user interface 108 to provide information, such as one or more commands and/or data to provide some examples, to the service A. Similarly, the operator may use the NFC user interface 110 to receive information, such as one or more commands and/or data to provide some examples, from the complement of services B through E. The operator may also use the NFC user interface 110 to provide information, such as one or more commands and/or data to provide some examples, to the complement of services B through E.

FIG. 8E graphically illustrates a fourth mapping of services to user interfaces according to an exemplary embodiment of the present invention. The user interface controller, such as the user interface controller 202 to provide an example, intelligently routes the information from the complement of services A through E to the communications device user interface 108 and/or the NFC user interface 110 when the battery power indicator 152 indicates the actual charge that is stored in the communications device battery 102 is at a $n^{th}$ level. The $n^{th}$ level indicates that the actual charge stored in the communications device battery 102 has become so depleted that they are unable to reliably operate the communications device user interface 110. Because the service A represents a single capable service, the communications device can longer offer service A when the communications device can no longer reliably operate the communications device user interface 110. The operator may use the NFC user interface 110 to receive information, such as one or more commands and/or data to provide some examples, from the complement of services B through E. The operator may also use the NFC user interface 110 to provide information, such as one or more commands and/or data to provide some examples, to the complement of services B through E.

An Exemplary Operational Control Flow of the User Interface Controller

FIG. 9 is a flowchart of exemplary operational steps of the user interface controller according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 9.

At step 910, the operational control flow performs a first service and a second service. The second service relates to NFC communications between a communications device, such as the communications device 100 or the communications device 400 to provide some examples to other NFC capable communications devices. The first service may include wireless communication between the communications devices and other communications devices that may not be NFC capable, other computing capabilities, such as Short Message Service (SMS), electronic mail, Internet access, gaming, short range wireless communications, camera, Multimedia Messaging Service (MMS) messaging, digital audio player, radio, and Global Positioning System (GPS) services, and/or any other suitable service that will be apparent to those skilled in the relevant art(s) without departing from the spirit and scope of the present invention.

At step 920, the operational control flow compares an actual charge stored in a battery, such as the communications device battery 102, of the communications device to a plurality of power thresholds. The operational control flow may provide an indicator of the actual charge that is stored in the battery. This indicator may include multiple encoded bits that are representative of the actual charge that is stored in the battery at step 920. Alternatively, The operational control flow may provide the actual charge that is stored in the battery at step 920.

At step 930, the operational control flow routes information that results from the first service and the second service to a communications device user interface, such as the communications device user interface 108, when an actual charge stored in a battery is greater than a first power threshold from among the plurality of power thresholds. The operational control flow processes the information that results from the first service and the second service to intelligently route this information to the communications device user interface based upon the actual charge. Specifically, the operational control flow compares the actual charge to one or more power thresholds as discussed above to determine how to route the information that results from the first service and the second service to the communications device user interface from among the multiple user interfaces. The operational control flow then routes the information that results from the first service and the second service to the communications device user interface when the actual charge is greater than the first power threshold.

At step 940, the operational control flow routes information that results from the second service to a NFC user interface, such as the NFC user interface 110, when the actual charge is greater than a second power threshold among the plurality of power thresholds where the second power threshold is greater than the first power threshold. The operational control flow processes the information that results from the second service to intelligently route this information to the NFC user interface based upon the actual charge. Specifically, the operational control flow compares the actual charge to one or more power thresholds as discussed above to determine how to route the information that results from the second service to the NFC user interface from among the multiple user interfaces. The operational control flow then routes the information that results from the second service to the NFC user interface when the actual charge is greater than the second power threshold indicating that the actual charge is less than when the actual charge is greater than the first power threshold.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A communications device, comprising:
   a communications device functionality configured to perform a first service; and
   a near field communication (NFC) device configured to perform a second service, to route information that results from the first service and the second service to a communications device user interface when an actual charge stored in a battery is greater than a first power threshold from among a plurality of power thresholds, and to route the information that results from the second service to a NFC user interface when the actual charge is greater than a second power threshold from among the plurality of power thresholds, the second power threshold being less than the first power threshold.

2. The communications device of claim 1, wherein the communications device user interface device is configured to receive its power from the battery.

3. The communications device of claim 1, wherein the NFC user interface is configured to harvest its power from a communications signal.

4. The communications device of claim 1, wherein the NFC device comprises:
   a NFC operational controller configured to route the information that results from the first service and the second service to the communications device user interface when the actual charge is greater than the first power threshold and to route the information that results from the second service to the NFC user interface when the actual charge is greater than the second power threshold.

5. The communications device of claim 4, wherein the NFC operational controller is further configured to route the information that results from the first service to the NFC user interface when the actual charge is greater than a third power threshold from among the plurality of power thresholds, the third power threshold indicating the actual charge is unable to reliably operate the communications device user interface.

6. The communications device of claim 4, wherein the NFC operational controller comprises:
   a NFC device power controller configured to monitor the actual charge to provide a user interface power indicator; and
   a function interface display selector module configured to compare the user interface power indicator with the plurality of power thresholds, to route the information that results from the first service and the second service to the communications device user interface when the user interface power indicator is greater than the first power threshold, and to route the information that results from the second service to the NFC user interface when the user interface power indicator is greater than the second power threshold.

7. The communications device of claim 4, wherein the NFC operational controller is further configured to route the information that results from the first service to the communications device user interface when the actual charge is greater than the first power threshold and to route at least some of the information that results from the first service to the NFC user interface when the actual charge is greater than the second power threshold.

8. The communications device of claim 4, wherein the NFC device further comprises:
   a NFC communications module configured to perform the second service to enable the communications device to exchange information with other NFC capable communications devices.

9. The communications device of claim 1, wherein the communications device is implemented as part of a mobile device.

10. The communications device of claim 1, wherein the second service relates to NFC communications between the communications device and other NFC capable communications devices, and wherein the first service relates to services other than the first service.

11. A method for performing one or more services by a communications device, comprising:
performing, by the communications device, a first service and a second service;
comparing an actual charge stored in a battery of the communications device to a plurality of power thresholds;
routing, by the communications device, information that results from the first service and the second service to a communications device user interface when an actual charge stored in a battery is greater than a first power threshold from among the plurality of power thresholds; and
routing, by the communications device, information that results from the second service to a NFC user interface when the actual charge is greater than a second power threshold from among the plurality of power thresholds, the second power threshold being greater than the first power threshold.

12. The method of claim 11, wherein the routing the information that results from the second service comprises:
routing, by the communications device, at least some of the information that results from the first service to the NFC user interface when the actual charge is greater than the second power threshold.

13. The method of claim 11, further comprising:
routing the information that results from the first service to the NFC user interface when the actual charge is greater than a third power threshold from among the plurality of power thresholds, the third power threshold indicating the actual charge is unable to reliably operate the communications device user interface.

14. The method of claim 11, wherein the comparing the actual charge comprises:
monitoring the actual charge to provide a user interface power indicator.

15. The method of claim 14, wherein the routing the information that results from the first service comprises:
routing the information that results from the first service and the second service to the communications device user interface when the user interface power indicator is greater than the first power threshold.

16. The method of claim 14, wherein the routing the information that results from the second service comprises:
routing the information that results from the second service to the NFC user interface when the user interface power indicator is greater than the second power threshold.

17. A communications device, comprising:
a communications control device configured to perform a first service and to route information that results from the first service to a communications device user interface when an actual charge stored in a battery is greater than a first power threshold; and
a NFC device configured to perform a second service and to route the information that results from the second service to a NFC user interface when the actual charge is less than the first power threshold.

18. The communications device of claim 17, wherein the NFC device comprises:
a NFC operational controller configured to route the information that results from the first service to the NFC user interface when the actual charge is less than the first power threshold, the actual charge being less than the first power threshold indicating the actual charge is unable to reliably operate the communications device user interface.

19. The communications device of claim 18, wherein the NFC operational controller comprises:
a NFC user interface controller configured to route the information that results from the second service to the NFC device user interface on the actual charge.

20. The communications device of claim 17, wherein the communications control device comprises:
a communications device user interface controller configured to route the information that results from the first service to the communications device user interface based on the actual charge.

* * * * *